July 19, 1938.　　　　F. A. FRITZSCH　　　　2,124,164
TAILSTOCK
Filed July 11, 1935　　　　2 Sheets-Sheet 1
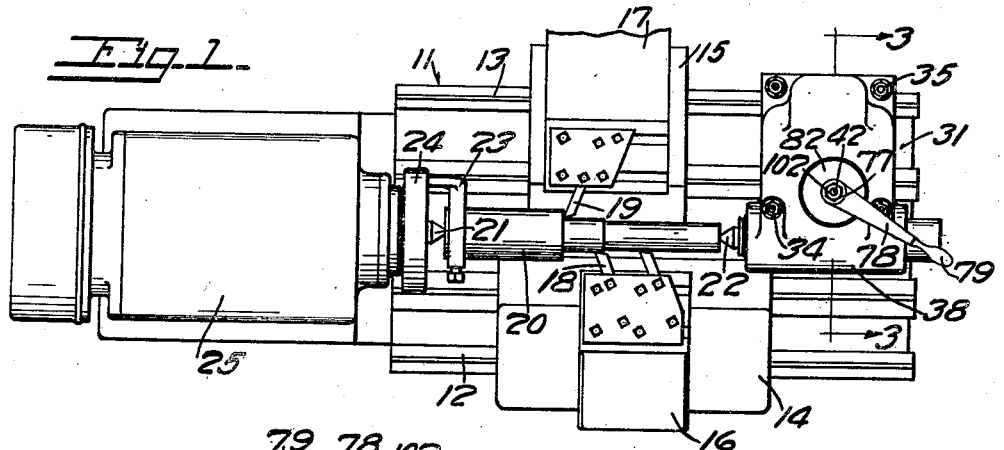
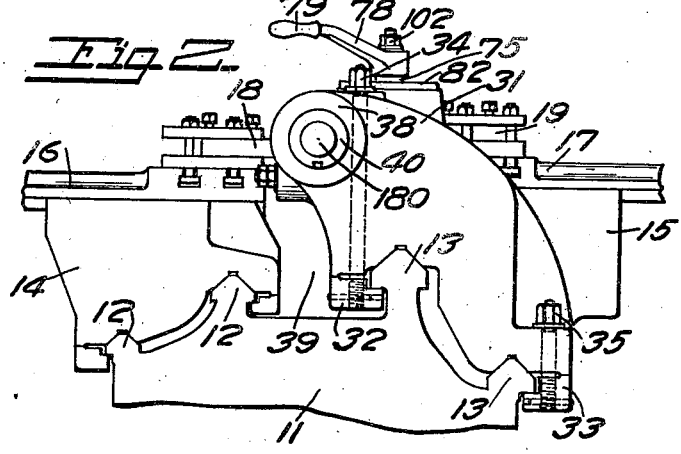
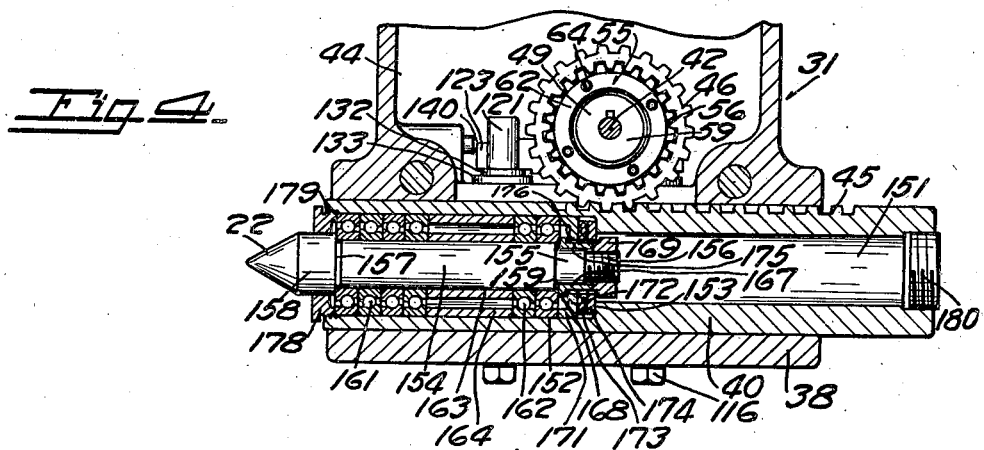

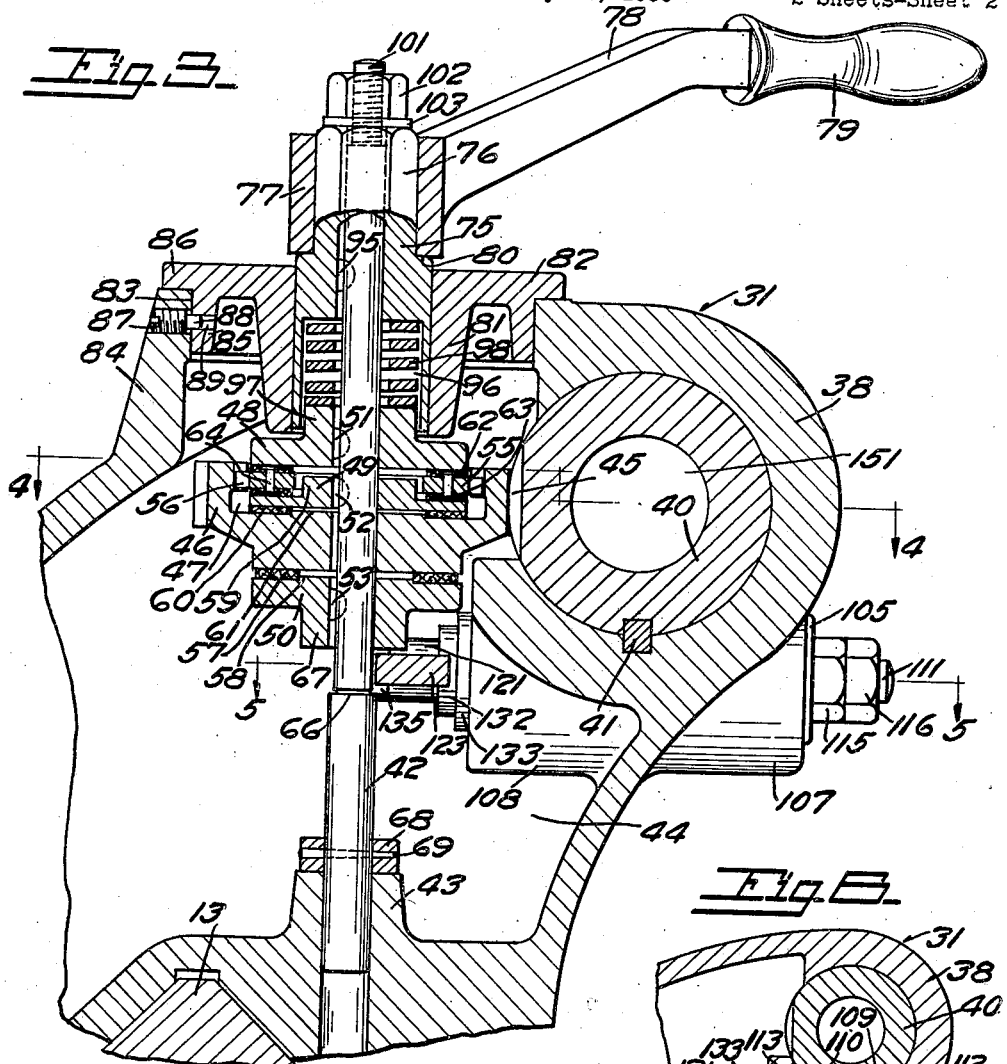

Patented July 19, 1938

2,124,164

UNITED STATES PATENT OFFICE 2,124,164

TAILSTOCK

Frank A. Fritzsch, Cincinnati, Ohio, assignor to The Lodge & Shipley Machine Tool Company, Cincinnati, Ohio, a corporation of Ohio Application July 11, 1935, Serial No. 30,870

7 Claims. (Cl. 82—31)

My invention relates to tailstocks for lathes and other machines in which the work is placed between centers.

In tailstocks of this character the tail spindle is moved endwise for coaction of the tail center with the work, and for release of the work, the tail spindle being clamped in work coacting relation. The means for endwise movement of the tail spindle and the means for clamping the same have heretofore usually been separate devices, separately operable.

It is the object of the present invention to combine these devices in novel manner; further, to so combine them in novel manner that they may be operated by a manually movable part by a single movement of said part; and, further, to connect the spindle moving means and the spindle clamping means in spaced relation for sequential movement of the same when engaging the work and clamping the spindle.

The present invention consists in novel means and associations and combinations of means for accomplishing these objects; further, in providing novel means for moving the spindle lengthwise; further, in providing novel means for clamping the spindle; further, in providing novel means operatively connecting the spindle moving means and the spindle clamping means; further, in providing novel means for associating these devices in such manner that they are sequentially operated by a single operating part; and, further, in providing novel means reacting on the clamping means and the endwise moving means whereby to relieve end pressure upon the tail center due to expansion of the work under heat generated in the cutting operation.

The invention consists, further, in the construction, arrangements and combinations of parts hereinafter more fully described and claimed.

In the drawings:

Fig. 1 is a plan view of a lathe embodying my improved device, partly broken away.

Fig. 2 is an end view of the same, partly broken away.

Fig. 3 is a cross-section of my improved device, taken on the line 3—3 of Fig. 1.

Fig. 4 is a longitudinal section of the same, taken in the plane of the line 4—4 of Fig. 3.

Fig. 5 is a longitudinal section, taken on the line 5—5 of Fig. 3; and,

Fig. 6 is a cross section, taken in the plane of the line 6—6 of Fig. 5.

The bed of the machine is exemplified at 11, having guideways 12, 13 on which carriages 14, 15 are slidable lengthwise of the bed, tool slides 16, 17 being mounted on the carriage and having tools 18, 19 secured thereto. The work 20, which is shown as a heavy piece of work in Fig. 1, is arranged to be centered between the head center 21 and the tail center 22, and to be driven by a dog 23, secured to the work, and extending from the face plate 24 on the usual head spindle suitably journaled in the headstock 25 of the lathe and suitably driven for rotating the head spindle and the work.

The parts so far described may be of any ordinary or usual construction, and the carriages and tool slides may be suitably operated for coaction of the tools with the work, these parts being mere exemplifications of a machine in which the device of the present invention may be employed, said device being, however, employable in other relations.

A tailstock 31 is provided for the machine and is arranged to be positioned lengthwise of the guideways 13 and to be clamped in adjusted positions by suitable clamps 32, 33, operated by suitable studs and nuts 34, 35 for clamping the tailstock to the bed and releasing the same for suitably positioning the same lengthwise of the bed.

The tailstock is provided with a suitable bearing 38 extending lengthwise of the bed, which is shown overhanging the space 39 between the guideways for the front carriage and the rear carriage respectively, so as to partially overhang the front carriage 14 for compactness of arrangement.

A tail spindle 40 is movable endwise in the bearing 38 and has a close sliding fit therein, being prevented from turning by spline connection 41 with the bearing 38.

The tail spindle is provided with the tail center 22, which is arranged to have engagement with the work in usual manner for centering the work. The tail spindle is arranged to be moved endwise for coaction of its tail center with the work when centering the work between the head center and the tail center, and for release of the work, and is arranged to be clamped in work engaging position.

The means for endwise moving and for clamping the tail spindle are exemplified as comprising a shaft 42, (Figs. 3 and 4), journaled in a bearing 43 in the tailstock, and extending through a cavity 44 in the body of the tailstock. The tail spindle is provided with a rack 45 with which a gear 46 meshes, the shaft being rotatable within the gear. The gear has a recess 47. Disks 48, 49 and 50 have operative connections with the shaft so as to rotate therewith, as by splines 51, 52, 53.

A disk 55 has operative connection with the gear 46, (Figs. 3 and 4), so as to rotate therewith, as by means of a spline tooth clutch 56, comprising meshing teeth on the outer periphery of the disk 55 and the inner face of the wall of the recess 47 of the gear.

A friction disk 57 is located between the disk 50 and the lower end of the hub of the gear 46, being centered about an annular rib 58 extending from said disk.

The disk 49 has a hub 59. It is centered about the shaft 42 and makes contact with a friction disk 60 in the bottom of the recess in the gear centered about an annular rib 61 on said bottom.

Friction disks 62, 63 are fixed to the respective sides of the disk 55, as by rivets 64, forming an assembled friction plate (Figs. 3 and 4). This assembled friction plate is received about the hub 59 of the disk 49 in the recess 47 of the gear and connected to rotate with the gear by meshing the teeth of the clutch 56. The friction disk 62 is located between the disks 48 and 55, and the friction disk 63 is located between the disks 55 and 49.

The disks 48, 49 and 50 rotate with the shaft, and the hub of the gear which forms a disk having friction faces at its respective sides and the disk 55 rotate with the gear, adjacent disks having friction disks between them, forming friction drive connection between the shaft and the gear. The disks 48, 49 and 50 are shiftable along the shaft for adjustments of the friction resistance and for accommodating the variations in compression of the friction disks in this friction drive connection.

The shaft is provided with a shoulder 66 on which the lower end of the hub 67 of the disk 50 rests.

A collar 68 is fixed to the shaft 42, as by a pin 69, the collar forming a step bearing for said shaft.

A sleeve 75 is received about the upper end of the shaft, (Figs. 1, 2 and 3), and has a head 76 about which the hub 77 of an operating arm 78 having a handle 79 is received, the hub resting on an annular shoulder 80 on the sleeve. This arm and the sleeve have operative connection with each other for rotating the sleeve by angular movement of the arm, as by forming the head polygonal in cross-section, the inner wall of the bore of the hub 77 being similarly formed.

This sleeve is rotatable in a bearing 81, on a closure 82, for closing an opening 83 in the wall 84 of the cavity in the body of the tailstock, this opening being sufficiently large for insertion and removal of the shaft 42 and its connected parts. The closure is provided with an inwardly extending annular flange 85 received snugly within said opening and with a radially extending seating flange 86 arranged to seat on the outer end of the wall of said opening, there being a set screw 87 threaded in said wall and having an inner reduced end 88 firmly received in a hole 89 in the closure for holding the closure securely in place. There may be a number of these set screws between said wall and said closure.

The sleeve 75 has operative connection with the shaft 42, so as to rotate the same, as by means of a spline 95 (Fig. 3). The inner end of the sleeve is provided with an enlarged bore 96 into the outer end of which the hub 97 of the disk 48 is received, there being a spring 98 between the inner wall of said enlarged bore and said hub for urging frictional engagement between the disks.

The outer end of the shaft is threaded as at 101 for receiving an adjusting nut 102 thereabout, there being a washer 103 between said adjusting nut and the outer end of said sleeve.

The adjusting nut and washer are preferably of less diameter than the sleeve to permit ready placing of the hub of the operating handle on said sleeve and removal of the same therefrom, so as to locate the handle of the operating arm in suitable position for manipulation, depending on the position of the operator and the character of work that is being performed. It will be noted that there are quite a number of facets on the head 76 of the sleeve so that the angular position of the operating arm may be adjusted to a nicety. The parts centered about the shaft between the shoulder 66 and the nut 102 may be readily slipped on and off the shaft.

The clamping means for the spindle exemplified are shoes 105, 106, (Figs. 5 and 6), slidable in bearings 107, 108 in the body of the head stock and having arcuate clamping faces 109, 110 frictionally engaging the outer periphery of the tail spindle. Two of these sets of clamping shoes are shown.

Draw bolts 111 extend through holes 112, 113 of the respective sets of clamping shoes. These draw bolts respectively have screw threaded ends 114, adjusting nuts 115 and jam nuts 116 being threaded thereover. The clamping shoes are held to the draw bolts to prevent relative rotation, by splines 117.

The other ends of the draw bolts are respectively provided with stirrups 121, having contact noses 122. A clamp bar 123 extends through the stirrups and is provided with inclined faces 124, with which said noses coact in the clamping operation, these faces forming cam faces for drawing the clamping shoes toward the tail spindle upon longitudinal movement of the clamp bar in one direction and for relief of said clamping shoes upon movement of said bar in the opposite direction. There are resting faces 125, 126 at the respective ends of the cam faces with which said noses respectively coact respectively during unclamped and during clamped relation of the clamps.

The clamp bar is provided with abutments for one end of the sets of clamping shoes, shown as riding faces 131 respectively riding on washers 132, coacting with spacing collars 133, respectively about the respective stirrups of the draw bolts and coacting with the clamping shoes in the clamping operations.

The hub 67 of the disk 50 is extended lengthwise as radially extending wings 135, 136, resting on the shoulder 66, and respectively forming operating teeth, one of which is employed for operating the clamp bar. The tooth is arranged to be received in a recess 137 in said clamp bar, having walls 138, 139, forming teeth, at its respective ends to substantially form a tooth space for reception of the tooth 135, arranged for lengthwise movement of the clamp bar. The wall 138 is shown longer than the wall 139. The tooth 135 engages the wall 138 during its movement in clamping direction for obtaining fully clamped relation of the shoes.

The tooth 135 engages the wall 139 during its movement in unclamping direction for unclamping the shoes, in which direction sufficient positive movement of the clamp bar for movement of the outer resting faces 126 from under the clamping noses 122 only is necessary, for arranging the shoes for unclamping relation, the clamping strain readily causing endwise slippage between the cam faces on said bar and said noses, aided by a releasing plunger 140 abutting the end of the clamp bar and located in a hole 141 of the body of the head stock and urged in unclamping direction by a spring 142 between said plunger and a plug 143 threaded in the outer end of said hole. This plunger retracts the clamp bar into extreme release position, and maintains it in this position, so that the tooth space 137 is maintained in correct position for receiving the tooth.

The other wing 136 limits retracting rotation of the shaft for correctly positioning the operating tooth 135 for entry into the tooth space 137 upon clamping movement of the handle 79.

The spindle is provided with a central bore 151, and has an enlarged bore 152 at its inner end, there being an annular shoulder 153 between said bores (Fig. 4).

The tail center is extended as a cylindrical shank 154, having a reduced inner end 155, the inner end of which is threaded as shown at 156. There is an annular shoulder 157 between the head 158 of the tail center and its shank 154 and an annular shoulder 159 between said shank and its reduced inner end.

Friction reducing bearings 161, 162 are located between the shank of the tail center and the cylindrical wall of the bore 152 of the spindle, these bearings being preferably radial and end thrust ball bearings, the series of the same toward the point of the tail center having an inward resistant thrust and the series of the same at the inner end of the shank having an outward resistant thrust, spacing collars 163, 164 being located between the respective inner raceways and outer raceways of said series. These friction reducing bearings and collars locate the shank 154 centrally in the bore 152, and resist lateral bending stresses induced for instance by heat expansive forces of the work upon the shank.

A collar 167 is located about the reduced inner end of the shank and has a radially extending annular flange 168 at its outer end, which forms an abutment for the inner end of the inner raceways and spacing collar of the friction reducing bearings, the outer ends of which have coaction with the annular shoulder 157 at the inner end of the head of the tail center. A nut 169 is threaded about the inner threaded end of the reduced extension 156 for clamping the collar 167 and the inner raceways and inner spacing collar toward the annular shoulder 157.

A collar 171 is located in the larger bore of the spindle and coacts with the outer raceways and spacing collar of the friction reducing bearings, and has a radially inwardly extending annular flange 172 about the collar 167, and forms a washer at one end of a reluctantly yieldable resilient washer 173, at the other end of which there is a washer 174 coacting with the annular shoulder 153.

The inner peripheries of the washers 172, 173 and 174 are received in an annular recess 175 in the outer peripheries of the collar 167 and nut 169, so that the tail center and its bearing may be moved into and out of its bore as a unit.

An adjusting collar 178 has threaded connection 179 with the outer end of the wall of the enlarged bore 152, for clamping said washers, the outer raceways and outer spacing collar of the friction reducing bearings endwise in said enlarged bore, for locating said parts in the enlarged bore of the tail spindle and adjustably clamping the same in place with the desired amount of normal compression upon the reluctantly yieldable resilient washer 173. There is an annular radial space 176 between the radially outwardly extending annular flange 168 of the collar 167 and the inwardly extending annular flange 172 of the collar 171. The washers 172 and 174 are preferably hard washers of metal. The washer 173 is preferably of resilient material of great density, such as chrome tanned leather.

The assembled tail center and the parts immediately associated therewith may be moved endwise as a unit out of the bore of the tail spindle by removal of the nut 178 and endwise outward movement of the balance of the parts. This outward movement may be aided by a pusher or tapping rod inserted in the bore 151 from its outer end, this outer end being normally closed by a plug 180 threaded therein. The parts yield readily endwise in the bore to the heat expansive forces of the work resisted by the reluctantly yieldable resilient washer 173 and to the expanding action of the said washer upon release of said forces.

In the operation of the device of the present invention the work is placed in line with and between the head center and the tail center, and the handle 79, having been placed in proper radial position with relation to the sleeve 75, to enable the operator to apply greatest force thereto, is moved in a single direction by the operator for endwise quick forceful movement of the tail spindle for proper coaction between the centers and the work and for clamping the tail spindle in proper position for cutting operations between the tools and the work.

The movement of the handle and operating arm rotates the sleeve 75, which is spline connected to the shaft 42. The rotation of the shaft rotates the disks 48, 49, 50, which, by reason of their friction connection with the disk 55 and the gear 46, rotate this gear. The gear meshes with the toothed rack 45 extending lengthwise on the tail spindle and moves the tail spindle for operative engagement of the tail center with the work.

The desired endwise force between the tail center and the work varies with the weight and length of the work and the cutting operations to be performed thereon, and this endwise force exerted by the operating handle extends over a substantial range by reason of the spring pressure of the spring 98 upon the friction disks, and may be further regulated by adjustment of the nut 102, which adjusts the axial distance between said nut and its washer 103 and the shoulder 66 on said shaft for adjusting the tension of said spring and the resilient pressure upon the friction connections between the shaft and the operating gear.

When operating on work of small diameter or tubing having a thin shell, or work which is otherwise weak in substance or form, the nut 102 may be adjusted so that light pressure is imposed on the spring 98 for ready yielding of the moving means for the tail spindle to avoid springing of the work. The spring 98 may also be compressed by adjustment of the nut 102 so that extremely heavy work pieces may be effectively centered, and so that the tail center may be effectively jammed into the work for peening the work and obtaining an effective drive connection between the work and the tail center to insure rotation of the latter. The device is adapted for a wide range of duty.

Continuation of movement of the handle and its operating arm in tail centering direction after the tail center has been moved into proper operative connection with the work and with sufficient force to maintain proper operative relation between the centers and the work, causes clamping of the tail spindle in moved position in its bearing by reason of the engagement of the tooth 135 with the actuating face 138 of the clamp bar, thereby moving said clamp bar endwise and moving the cam faces 124 thereon under the noses 122 for drawing the clamping shoes 105, 106 toward each other and thereby clamping said tail spindle in endwise adjusted relation.

There is a spaced operative relation between the endwise moving devices for longitudinal movement of the tail spindle and the clamping devices for clamping said spindle. During endwise movement of the tail spindle the tooth 135 is moving idly into and through the space 137 in the clamp bar toward the tooth or engaging face 138, and it reaches this engaging face for exerting clamping movement only after the tail spindle has been fully moved for operative relation of its tail center with the work. This clamping movement continues until the outer resting faces 126 of the clamp bar are located under the noses 122 to hold the clamp in clamped relation.

During the continuing movement of the operating arm in clamping direction after full longitudinal movement of the tail spindle in operative direction, there is slippage between the friction surfaces of the friction disks, the friction stresses for moving the tail spindle endwise continuing however until the tail spindle is fully clamped in operative position.

During such clamped relation and during the cutting operation upon the work, heating of the work due to such cutting operation frequently takes place, and sufficient heat is thereby often generated to cause expansion of the work, the lengthwise expansion of the work exerting endwise stresses upon the tail center. The tail center is shown rotatable in the tail spindle.

Such expansion of the work reacts upon the tail spindle and its bearing, and the clamp and friction moving means of the tail spindle. To accommodate such reaction, the reluctantly resilient yieldable cushion 173 is provided between the tail center and the tail spindle. Such cushion and the structure and relation of the friction reducing bearings are especially useful and are primarily provided for accommodating axial movement imparted to the tail center by the heat expansion of heavy work, such, for example, as shown in Fig. 1.

Referring to Fig. 4, the heat expansion force of the heavy work (Fig. 1) is directed initially against the inner races of the ball bearings and the inner collar 163 therebetween, resisted by the balls of the bearings and the outer races of said bearings and the outer collar 164 therebetween. The ball bearings resist such end pressure on the tail center and yield within their capacity to such end pressure by climbing action between the races and the balls resisted by the forces in the ball bearings to resume normal relations. Excess of such end pressure due to heat expansive forces of heavy work is transmitted by the outer races and the collar 171 and its inwardly extending annular flange 172, from which it is transmitted to the reluctantly yieldable resilient washer 173, whose inner end is anchored on the washer 174, held endwise by the shoulder 153 in the tail spindle 40, this reluctantly yieldable resilient washer 173 being a solid body of resilient material of great density, having the properties of chrome tanned leather, namely, of compressively yielding only to limited extent by great pressure and returning to normal condition and volume upon release of such pressure. This reluctant yielding of the washer 173 prevents injury to the ball bearings by excess pressure of the heat expanded work thereon. This cushion yields sufficiently to such endwise stresses upon the tail center to avoid detrimental effect upon the clamping means and the endwise moving means for the tail center, and to sufficient extent and sufficiently readily to effectively avoid buckling or bending of the work due to its heated condition. The cushion 173 readily returns to its normal condition and volume upon cooling of the work or upon recession of the tail center when the work is finished.

When it is desired to release the work, the handle and the operating arm are moved in a single reverse direction by the operator. During the first portion of this movement the tooth 135 is rotated in opposite direction for engagement with the wall or tooth 139 for initial release movement of the clamp bar 123, which movement is continued by the releasing movement between the cam faces, and by the spring pressed plunger 148. During this movement of the tooth 135 slippage takes place between the disks of the friction means during the time that the tail spindle is still in clamped relation. Immediately upon release of this clamped relation the further rotation of the shaft 42 in reverse direction moves the tail spindle into fully released position.

The present invention provides simple and ready means for sequential endwise movement and clamping of the tail spindle, provides novel means whereby various lengths of stroke may be imparted to the tail spindle in centering the work, compensates for detrimental reacting stresses upon the clamping and tail spindle moving devices caused by expansion of the work due to its being heated by the cutting means, provides ready means for sequential unclamping and lengthwise retreating movement of the tail spindle, provides novel means for accomplishing such sequential lengthwise and clamping movements by movement of a single operating part in a single direction, respectively for work engaging and disengaging relations, which is especially important in high speed machines for repetitional work in which great numbers of work pieces are successively centered and clamped and unclamped in the machine.

I claim:

1. In a tailstock for heavy work, the combination of a bearing, a sleeve movable endwise thereof, a sleeve moving part having operative connection with said sleeve for moving the same endwise, a clamp for clamping said sleeve in endwise moved relation fixedly to said bearing, a tail center movable endwise in said sleeve arranged to engage the work operated on by the cutting means, a reluctantly yieldable resilient cushion consisting of chrome tanned leather between said tail center and said sleeve reluctantly yieldable in axial direction, and an operating part having operative connection with said sleeve moving part for moving said sleeve endwise for operative engagement between said tail center and the work and normal positioning of said reluctantly yieldable resilient cushion, said operating part having operative connection with said clamp for clamping said clamp after endwise moved relation of said sleeve, and said reluctantly yieldable resilient cushion reluctantly and resiliently yieldable after positioning solely to the expansive forces of the heavy work heated by coaction with the cutting means during such fixedly clamped relation of said sleeve.

2. In a tailstock, the combination of a bearing, a spindle movable endwise thereof, a rack extending lengthwise on said spindle, a gear meshing with said rack, a shaft, said shaft rotatable in said gear, said gear provided with an end recess, a friction plate having clutch connection with the wall of said recess, a friction plate between the latter and the bottom of said recess secured to said shaft to rotate therewith, friction plates at the respective ends of said gear, said last-named friction plates secured to said shaft to rotate therewith, friction disks between said gear and said respective friction plates, an operating member connected with said shaft to rotate the same, a spring about said shaft between said operating member and said friction plates, and means for endwise adjustment between said shaft and said operating member for adjusting said spring and the friction resistance between said gear, said friction plates and said friction disks.

3. In a tailstock, the combination of a bearing, a tail spindle movable endwise thereof, and a clamp for clamping said spindle to said bearing comprising a plurality of spaced-apart pairs of shoes, a clamp bolt connecting the shoes of each of said pair of clamping shoes, said clamp bolts provided with stirrups, a clamp bar in said stirrups, said clamp bar and said stirrups provided with cam faces and coacting parts therefor, and means for lengthwise movement of said clamp bar for cam movement between it and said stirrups whereby to move said clamping shoes in clamping directions to clamp said spindle in one direction of movement of said clamp bar and for unclamping said spindle during opposite direction of movement of said clamp bar.

4. In a tailstock, the combination of a bearing, a tail spindle movable endwise thereof, a plurality of pairs of clamping shoes for clamping said spindle, tension rods for said respective pairs of clamping shoes, stirrups at one of the ends of said tension rods and pairs of clamping shoes, adjusting means for the other ends of said tension rods, a clamp bar in said stirrups, said clamp bar provided with riding faces for each of said first-named ends of said pairs of clamping shoes, said clamp bar and said stirrups provided with cam faces and coacting parts therefor arranged to clamp said shoes by lengthwise movement of said clamp bar, and means for lengthwise movement of said clamp bar for climbing movement between said cam faces and said coacting parts and clamping movements of said shoes and for opposite endwise movement of said clamp bar for receding movements between said cam faces and said coacting parts to unclamp said shoes, and spring means to normally retain said clamp bar in unclamped relation.

5. In a tailstock, the combination of a bearing, a tail spindle movable endwise thereof, a pair of clamping shoes for clamping said spindle, a tension rod for said pair of clamping shoes, a stirrup at one end of said tension rod and pair of clamping shoes, adjusting means for the other end of said tension rod, a clamp bar in said stirrup, said clamp bar provided with a riding face for said first-named end of said clamp shoe, clamping shoes, said clamp bar and said stirrup provided with a cam face and coacting part therefor arranged to clamp said shoes by lengthwise movement of said clamp bar, and means for lengthwise movement of said clamp bar for climbing movement between said cam face and said coacting part and clamping movement of said shoes and for opposite endwise movement of said clamp bar for receding movements between said cam face and said coacting part to unclamp said shoes, and spring means to normally retain said clamp bar in unclamped relation.

6. The combination of a bearing, a work engaging spindle movable endwise thereof, an upright shaft, a step and radial bearing for the lower end of said shaft, a rotatable member loose about said shaft and having operative connection with said spindle to move the same endwise, friction disks about said shaft at the respective ends of said member connected with said shaft to rotate therewith, a sleeve about the upper end of said shaft having rotative connection with said shaft, a bearing about said sleeve, a spring about said shaft between said sleeve and said friction disks, and adjusting means at the upper end of said shaft between said shaft and said sleeve for adjusting said sleeve endwise of said shaft for adjusting said spring and the friction resistance between said disks and said member, and a handle provided with a hub having multi-radial connection with said sleeve and movable freely endwise therefrom past said adjusting means.

7. In a tailstock, the combination of a bearing, a tail spindle movable endwise thereof, said tail spindle provided with a bore and having a shoulder at the inner end of said bore, a rotatable tail center provided with a shank in said bore and a shoulder at the outer end of said shank, friction reducing bearings having inner raceways about said shank and outer raceways within the wall of said bore, said shoulder on said tail center coacting with said inner raceways, washers including a solid reluctantly yieldable resilient washer of chrome tanned leather about the axis of said tail center between said first-named shoulder and the inner end of said outer raceways, and acting on said outer raceways to resist the heat expansion of the work caused by the cutting action of the tools on the work and an adjustable member between the inner end of said shank and the inner end of said inner raceways provided with holding means to hold said washers to said tail center when said tail center is released, and an adjustable collar about the outer end of said tail center having adjustable connection with the outer end of said tail spindle and engagement with the outer end of said outer raceways for adjustably clamping said outer raceways and said washers toward said first-named shoulder and removable for release of said tail center, said friction reducing bearings, said collars and said adjustable member as an entity from said bore.

FRANK A. FRITZSCH.